United States Patent
Ahn et al.

(10) Patent No.: US 9,313,608 B2
(45) Date of Patent: Apr. 12, 2016

(54) METHOD AND APPARATUS FOR PERFORMING RANDOM ACCESS

(75) Inventors: Joon Kui Ahn, Anyang-si (KR); Dong Youn Seo, Anyang-si (KR); Suck Chel Yang, Anyang-si (KR); Min Gyu Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 97 days.

(21) Appl. No.: 14/126,013

(22) PCT Filed: Jun. 15, 2012

(86) PCT No.: PCT/KR2012/004746
§ 371 (c)(1),
(2), (4) Date: Dec. 13, 2013

(87) PCT Pub. No.: WO2012/173428
PCT Pub. Date: Dec. 20, 2012

(65) Prior Publication Data
US 2014/0112286 A1   Apr. 24, 2014

Related U.S. Application Data

(60) Provisional application No. 61/497,087, filed on Jun. 15, 2011.

(51) Int. Cl.
H04W 74/08 (2009.01)
H04W 4/00 (2009.01)
H04W 72/04 (2009.01)
H04W 74/00 (2009.01)
H04W 72/12 (2009.01)

(52) U.S. Cl.
CPC ............ *H04W 4/005* (2013.01); *H04W 72/042* (2013.01); *H04W 74/002* (2013.01); *H04W 74/0833* (2013.01); *H04W 72/12* (2013.01)

(58) Field of Classification Search
CPC ... H04W 4/005; H04W 72/042; H04W 72/12; H04W 74/0833; H04W 74/002; H04W 74/08
See application file for complete search history.

(56) References Cited

U.S. PATENT DOCUMENTS

2009/0268666 A1* 10/2009 Vujcic ............... H04W 74/0866 370/328
2010/0103889 A1*  4/2010 Kim ..................... H04W 74/004 370/329
2011/0274040 A1* 11/2011 Pani et al. ...................... 370/328
2012/0294146 A1* 11/2012 Wu ................................ 370/230

OTHER PUBLICATIONS

3GPP TS 36.321 V 9.0.0 technical specification EUTRA MAC protocol specification Sep. 2009.*

(Continued)

*Primary Examiner* — Gregory Sefcheck
*Assistant Examiner* — Rina Pancholi
(74) *Attorney, Agent, or Firm* — Birch, Stewart, Kolasch & Birch, LLP

(57) ABSTRACT

Provided is a method and an apparatus for performing a random access process in a wireless communication system. A wireless device transmits a random access preamble, based on a random access resource, to a base station, then receives a random access response to the random access preamble. The random-access resource can be set to the wireless device or to the group to which the wireless device belongs.

12 Claims, 10 Drawing Sheets

(56) References Cited

OTHER PUBLICATIONS

3GPP SA WG2 Temporary Document, TD S2-102634, "Randomisation in Access Stratum," 3GPP TSG SA WG2 Meeting #79, May 10-14, 2010, pp. 1-3.
3GPP TR 23.888 V1.0.0, "3rd Generation Partnership Project; Technical Specification Group Services and System Aspects; System Improvements for Machine-Type Communications; (Release 10)," Jul. 2010, pp. 1-80.
3GPP TS 36.321 V9.0.0, "3rd Generation Partnership Project; Technical Specification Group Radio Access Network; Evolved Universal Terrestrial Radio Access (E-UTRA) Medium Access Control (MAC) protocol specification (Release 9)," Sep. 2009, pp. 1-47.
LG Electronics, "Randomisation in Access Stratum", 3GPP TSG SA WG2 Meeting #79, TD S2-102634, May 10-14, 2010, pp. 1-3.

* cited by examiner

METHOD AND APPARATUS FOR PERFORMING RANDOM ACCESS

CROSS REFERENCE TO RELATED APPLICATIONS

This application is the National Phase of PCT/KR2012/004746 filed on Jun. 15, 2012, which claims priority under 35 U.S.C. §119(e) to U.S. Provisional Application No. 61/497,087 filed on Jun. 15, 2011, all of which are hereby expressly incorporated by reference into the present application.

BACKGROUND OF THE INVENTION

1. Field of the Invention

The present invention concerns wireless communication, and more specifically, to a method and apparatus for performing random access in a wireless communication system.

2. Related Art

MTC (Machine-Type Communication) is a type of data communication including one or more entities that do not require humans' interaction and is also referred to as M2M (Machine to Machine) communication. In other words, MTC involves the concept that a mechanical device, not a terminal used by a human, fulfils communication through an existing wireless communication network.

A mechanical device used for MTC is called an MTC device or M2M device. There are various types of MTC devices, such as vending machines or water level meters used in, e.g., a dam, depending on MTC services.

The MTC service may differ from a service optimized for human-to-human communication (which is called HTC (Human-Type Communication). The MTC device has different features from general HTC devices. MTC, as compared with HTC offered by a current mobile network, features a different market scenario, data communication, low costs and effort, potentially a good number of devices, broad service coverage, and low traffic per device.

A random access procedure is used for various purposes including initial entry into network or uplink sync. The existing random access procedure has been designed in consideration of communication between an HTC device and a base station.

A need exists for a random access procedure considering the features of the MTC device.

SUMMARY OF THE INVENTION

The present invention provides a method and apparatus for performing random access using a pre-configured resource.

The present invention provides a method and apparatus for performing random access for MTC (Machine-Type Communication).

In an aspect, there is provided a method of performing a random access procedure by a radio device in a wireless communication system. The method comprises receiving configuration information for a random access resource from a base station; transmitting a random access preamble to the base station based on the random access resource; receiving a random access response in response to the random access preamble; and transmitting a scheduled message to the base station, wherein the random access resource is configured for the radio device or a group to which the radio device belongs.

The random access resource may include a transmission period of the random access preamble.

The random access resource may include information on a maximum count for re-transmission of the random access preamble.

The random access resource may include an uplink resource, and the scheduled message is transmitted using the uplink resource.

The method may further comprise receiving, from the base station, a group triggering message indicating transmission of the random access preamble.

In another embodiment, there is provided a radio device performing a random access procedure in a wireless communication system. The radio device comprises an RF (radio frequency) unit transmitting and receiving a radio signal; and a processor connected with the RF unit, wherein the processor receives configuration information for a random access resource from a base station; transmits a random access preamble to the base station based on the random access resource; receives a random access response in response to the random access preamble; and transmits a scheduled message to the base station. The random access resource is configured for the radio device or a group to which the radio device belongs.

A random access procedure may be carried out more quickly. A random access procedure is provided which is appropriate for a radio device having low mobility and relatively low uplink data traffic.

DESCRIPTION OF EXEMPLARY EMBODIMENTS

The User Equipment (UE) may be stationary or mobile and may also be referred to as MS (mobile station), MT (mobile terminal), UT (user terminal), SS (subscriber station), wireless device), PDA (personal digital assistant), wireless modem, handheld device, etc.

The base station (BS) is typically a fixed station that communicates with a terminal and may also be referred to as eNB (evolved-NodeB), BTS (Base Transceiver System), Access Point, etc.

Hereinafter, the present invention is described based on 3GPP (3rd Generation Partnership Project) TS (Technical Specification) Release 8-based 3GPP LTE (long term evolution). However, this is merely an example, and the present invention may also apply to various wireless communication networks.

Figure 1:
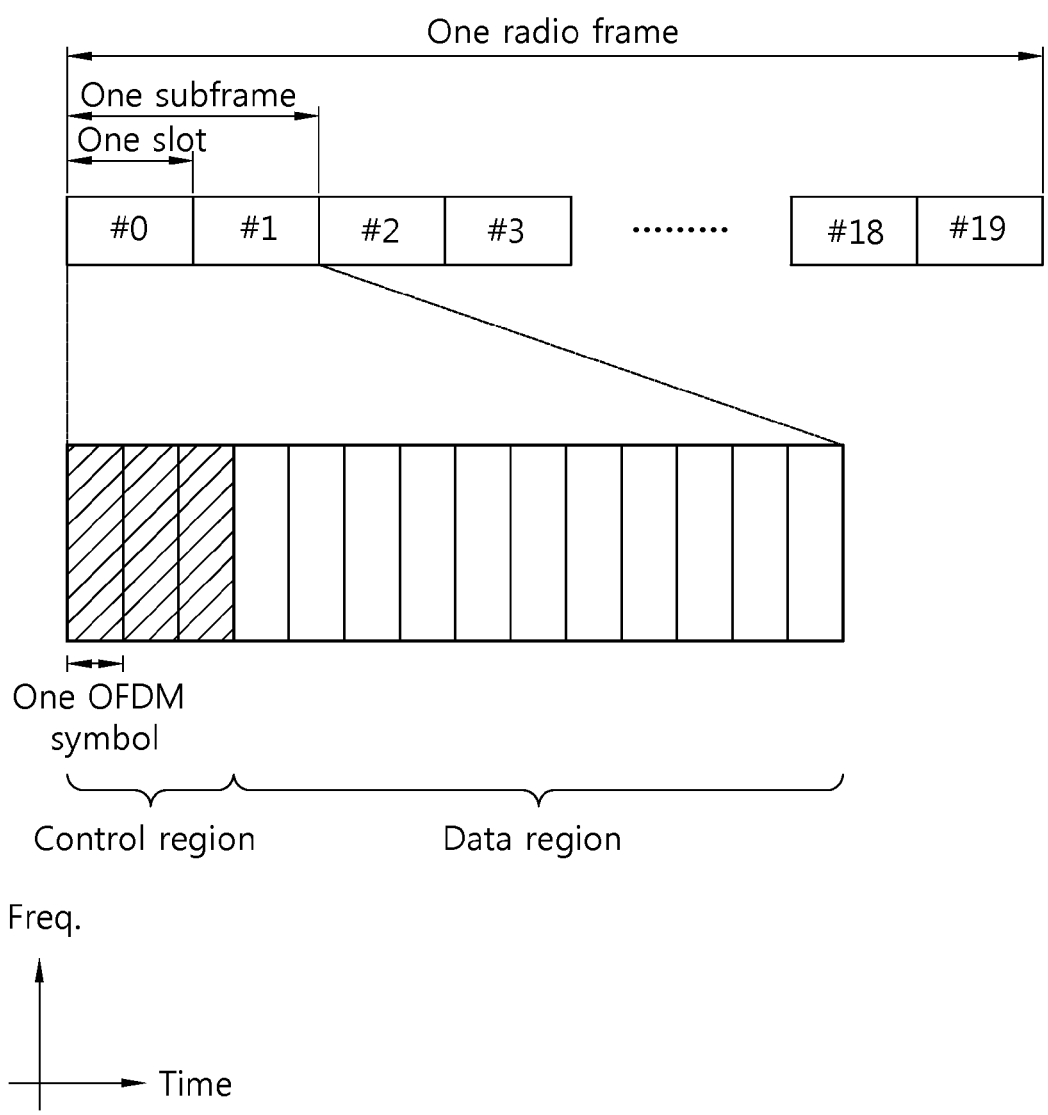
FIG. 1 shows the structure of a downlink radio frame in 3GPP LTE.

FIG. 1 shows the structure of a downlink radio frame in 3GPP LTE. This may refer to 3GPP TS 36.211 V8.7.0 (2009-05) "Evolved Universal Terrestrial Radio Access (E-UTRA); Physical Channels and Modulation (Release 8)," Ch. 6.

A radio frame includes ten sub-frames indexed 0 to 9. One sub-frame includes two consecutive slots. The time taken for one sub-frame to be transmitted is a TTI (transmission time interval). For example, the length of one sub-frame may be 1 ms, and the length of one slot may be 0.5 ms.

One slot may include, in the time domain, a plurality of OFDM (orthogonal frequency division multiplexing) symbols. The term "OFDM symbol" is used merely to represent one symbol period in the time domain because 3GPP LTE adopts OFDMA (orthogonal frequency division multiple access) on downlink, and thus, this does not limit the type and name of multiple access schemes. For example, the OFDM symbol may also be referred to as SC-FDMA (single carrier-frequency division multiple access) symbol or symbol period.

One slot includes seven OFDM symbols for purposes of description. However, depending on the length of a CP (Cyclic Prefix), the number of OFDM symbols included in one slot may vary. According to 3GPP TS 36.211 V8.7.0, one slot includes seven OFDM symbols in a normal CP and six OFDM symbols in an extended CP.

The resource block (RB) is a basis for resource allocation and includes a plurality of sub-carriers in one slot. For example, in case one slot includes seven OFDM symbols in the time domain and one resource block includes 12 sub-carriers in the frequency domain, the resource block may include 7×12 resource elements (REs).

The DL (downlink) sub-frame is separated into a control region and a data region in the time domain. The control region includes up to three first OFDM symbols in the first slot in the sub-frame. However, the number of OFDM symbols included in the control region may vary. In the control region, a PDCCH (Physical Downlink Control Channel) and other control channels are allocated, and in the data region, a PDSCH is allocated.

As set forth in 3GPP TS 36.211 V8.7.0, physical channels, in 3GPP LTE, may be separated into data channels such as a PDSCH (Physical Downlink Shared Channel) and a PUSCH (Physical Uplink Shared Channel) and control channels, such as a PDCCH (Physical Downlink Control Channel), a PCFICH (Physical Control Format Indicator Channel), a PHICH (Physical Hybrid-ARQ Indicator Channel) and a PUCCH (Physical Uplink Control Channel).

The PCFICH which is transmitted in the first OFDM symbol of the sub-frame carries a CIF (control format indicator) regarding the number of OFDM symbols (i.e., size of the control region) used for transmission of control channels in the sub-frame. The terminal receives the CIF over the PCFICH and then monitors the PDCCH.

Unlike the PDCCH, the PCFICH is transmitted through a fixed PCFICH resource of the sub-frame without using blind decoding.

The PHICH carries an ACK (positive-acknowledgement)/NACK (negative-acknowledgement) signal for uplink HARQ (hybrid automatic repeat request). The ACK/NACK signal for UL (uplink) data over the PUSCH transmitted by the terminal is transmitted over the PHICH.

The PBCH (Physical Broadcast Channel) is transmitted through first four OFDM symbols in the second slot of the first sub-frame of the radio frame. The PBCH carries system information necessary for the terminal to communicate with the base station. The system information transmitted through the PBCH is referred to as MIB (master information block). In comparison, the system information transmitted over the PDSCH indicated by the PDCCH is referred to as SIB (system information block).

The control information transmitted through the PDCCH is referred to as downlink control information (DCI). The DCI may include resource allocation of the PDSCH (also referred to as DL (downlink) grant), resource allocation of the PUSCH (also referred to as UL (uplink) grant), set of transmit power control commands for individual UEs in any UE group and/or VoIP (Voice over Internet Protocol) activation.

In 3GPP LTE, blind decoding is used for detecting the PDCCH. Blind decoding is a scheme in which a desired identifier is demasked to the CRC of a received PDCCH (referred to as a candidate PDCCH) and CRC error check is conducted so as to identify whether the corresponding PDCCH is its own control channel.

After determining the PDCCH format according to the DCI to be sent to the terminal, the base station adds a CRC (Cyclic Redundancy Check) to the DCI and masks the CRC with a unique identifier (which is referred to as RNTI (Radio Network Temporary Identifier)) depending on the owner or purpose of the PDCCH.

The control region in the sub-frame includes a plurality of CCEs (control channel elements). The CCE is a basis for logical allocation which is used to provide a PDCCH with a coding rate according to the state of a radio channel and corresponds to a plurality of REGs (resource element groups). The REG includes a plurality of resource elements. According to the relationship between the number of CCEs and the coding rate provided by the CCEs, the format of the PDCCH and the possible number of bits of the PDCCH are determined.

One REG includes four REs and one CCE includes nine REGs. In order to configure one PDCCH, $\{1, 2, 4, 8\}$ CCEs may be used, and each element of $\{1, 2, 4, 8\}$ is referred to as a CCE aggregation level.

The number of CCEs used for transmission of the PDCCH is determined by the base station according to the channel state. For example, for a terminal having a good downlink channel state, one CCE may be used for transmitting the PDCCH. For a terminal having a poor downlink channel state, eight CCEs may be used for transmitting the PDCCH.

A control channel constituted of one or more CCEs performs interleaving on a per-REG basis, and after a cell ID (identifier)-based cyclic shift is performed, it is mapped with a physical resource.

In 3GPP LTE, transmission of a downlink transmission block is performed in a pair of PDCCH and PDSCH. Transmission of an uplink transmission block is performed in a pair of PDCCH and PUSCH. For example, the terminal receives a downlink transmission block over a PDSCH indicated by a PDCCH. The terminal receives a downlink resource allocation over a PDCCH by monitoring the PDCCH in a downlink sub-frame. The terminal receives a downlink transmission block over a PDSCH indicated by the downlink resource allocation.

Figure 2:
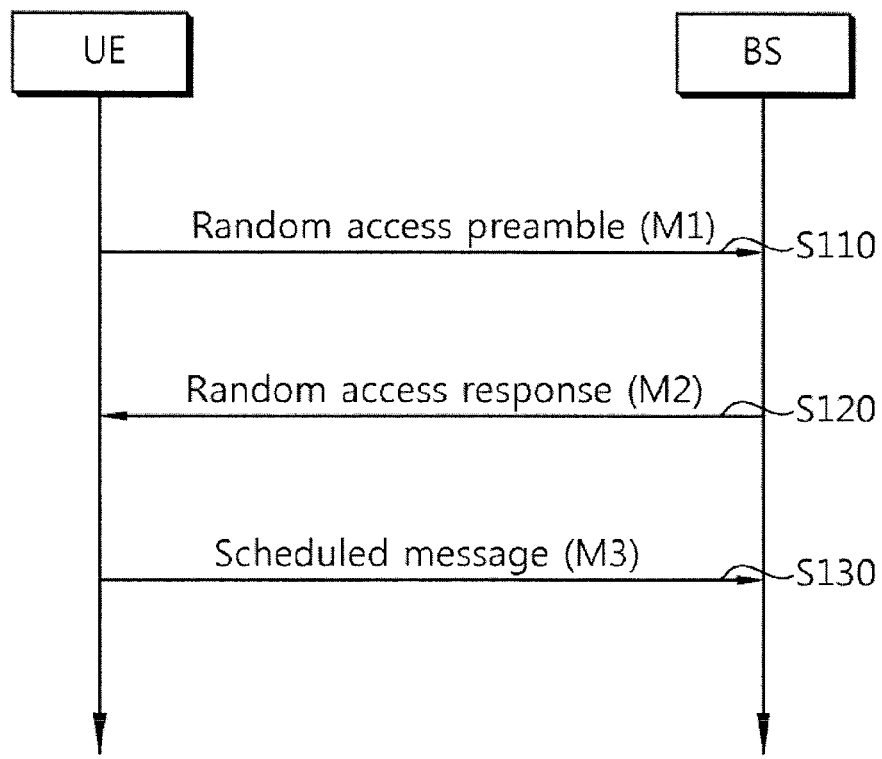
FIG. 2 is a flowchart illustrating a random access procedure according to the prior art.

FIG. 2 is a flowchart illustrating a random access procedure according to the prior art. The random access procedure is used for a terminal to obtain UL sync with a base station or to be allocated with a UL radio resource.

The terminal receives a root index and a PRACH (physical random access channel) configuration index from the base station. There are 64 candidate random access preambles defined by a ZC (Zadoff-Chu) sequence for each cell, and the root index is a logical index for the terminal to generate 64 candidate random access preambles.

Transmission of a random access preamble is limited by a specific time and frequency resource for each cell. The PRACH configuration index denotes a preamble format and a specific sub-frame where the random access preamble may be transmitted.

The following table shows an example of random access configuration set forth in 3GPP TS 36.211 V8.7.0 (2009-05), Ch. 5.7.

TABLE 1

| PRACH configuration index | Preamble format | System frame number | Sub-frame number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |

The terminal transmits a random access preamble, which has been arbitrarily selected, to the base station (S110). The terminal selects one of the 64 candidate random access preambles. The terminal then selects a corresponding sub-frame by the PRACH configuration index. The terminal transmits the selected random access preamble in the selected sub-frame.

When receiving the random access preamble, the base station sends a random access response (RAR) to the terminal (S120). The random access response is detected in two steps. First, the terminal detects a masked PDCCH with an RA-RNTI (random access-RNTI). The terminal then receives a random access response in an MAC (Medium Access Control) PDU (Protocol Data Unit) on the PDSCH indicated by the DL grant on the detected PDCCH.

Figure 3:
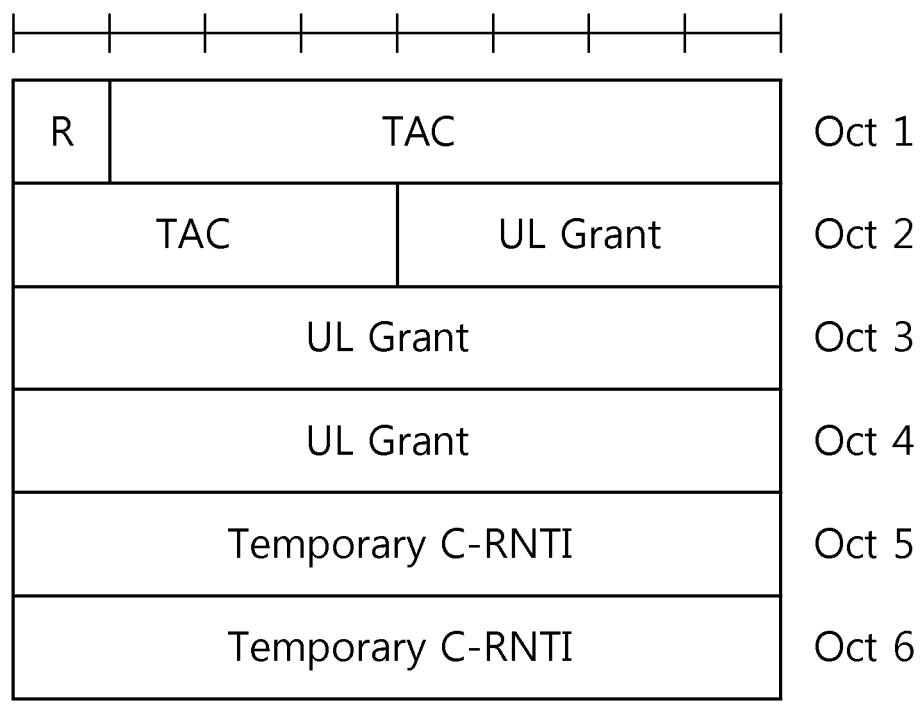
FIG. 3 shows an example of a random access response.

FIG. 3 shows an example of a random access response.

The random access response may include a TAC (Timing Advance Command), a UL grant, and a temporary C-RNTI.

The TAC is information indicating a time sync value, which is sent from the base station to the terminal in order to maintain UL time sync (time alignment). The terminal updates UL transmission timing using the time sync value. If the terminal updates time sync, a time sync timer (time alignment timer) starts or restarts. Only when the time sync timer operates, the terminal may perform UL transmission.

The UL grant is a UL resource used for transmitting a scheduling message that is to be described later.

Turning back to FIG. 2, the terminal transmits, to the base station, a message scheduled per the UL grant in the random access response (S130).

Hereinafter, the random access preamble, random access response, and scheduled message are also referred to as M1 message, M2 message, and M3 message, respectively.

MTC (Machine Type Communication) is now described.

MTC means that communication is fulfilled between a machine and another machine without a human's involvement, and is also referred to as M2M (Machine to Machine) communication.

Services offered via MTC is differentiated from the existing services provided through human-involved communication and provide a diversity of categories of services, such as tracking, metering, payment, medical services, remote control, etc. For service requirements for MTC features, refer to 3GPP TS 22.368 V1.1.1 (2009-11) "3rd Generation Partnership Project; Technical Specification Group Services and System Aspects; Service requirements for machine-type communications; Stage 1 (Release 10)."

The MTC device refers to a wireless device that supports the MTC service and may be part of the above-described terminals.

Figure 4:
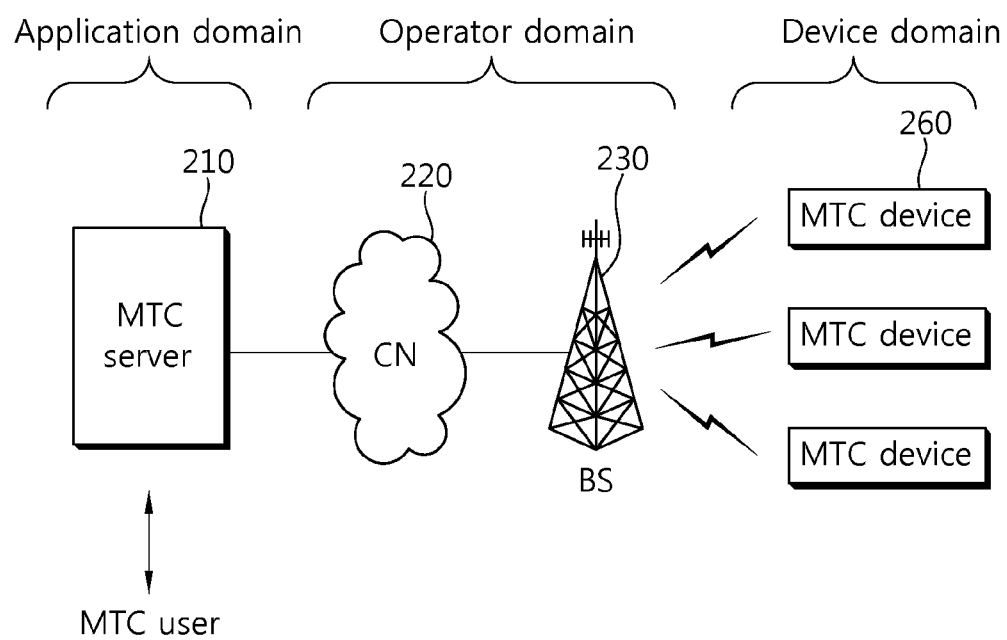
FIG. 4 shows the overall structure of MTC.

FIG. 4 shows the overall structure of MTC.

For an MTC service, an MTC system may be separated into an application domain, an operator domain, and a device domain. The application domain includes an MTC user and an MTC server 210. The operator domain includes a CN (Core Network) 220 and a base station 230. The device domain includes one or more MTC devices 260.

The MTC device 260 communicates with another MTC device or the MTC server 210 via a wireless network. The MTC server 210 may offer services, which are provided through the MTC device 260, such as metering, road information, control of user electronic devices, to the MTC user.

In order to efficiently support the MTC service, the MTC device's features such as low mobility, time tolerant, or small data transmission may be in consideration. Further, it may be assumed that numerous MTC devices may be present in one cell.

Each MTC device has a small amount of UL data, and many MTC devices are included in one cell. Accordingly, if DL/UL scheduling is achieved per DL/UL transmission, the signaling overhead for scheduling is increased, thus posing a significant load on the base station. In particular, when the MTC device's UL transmission is not continuous but discrete, the MTC device's UL time sync cannot be maintained, so that the base station requires a random access procedure.

There is suggested herein a scheme appropriate for discrete data transmission of an MTC device, which reduces signaling overhead of a base station. Although communication between an MTC device and a base station is described hereinafter, the present invention may also apply to communication between a plurality of terminals and a base station.

In order to manage a number of MTC devices, an MTC group including one or more MTC devices may be defined. A unique identifier for identifying an MTC group in a cell, a region of a base station, or an MTC region—this is referred to as MGID (MTC Group Identifier)—may be assigned. The MTC region includes one or more base stations. One MTC device may belong to one or more MTC groups.

As suggested herein, a random access resource is previously assigned per MTC device and/or MTC group. Configuration information on the random access resource may be delivered by the base station. The random access resource may be assigned to the MTC device through an upper layer message such as an RRC message by the base station. The random access resource may include at least one of time/frequency resources used for transmission of a random access preamble and generation information of the random access preamble. For example, according to the prior art, a root index and PRACH configuration index are defined cell-specifically, but according to the present invention, a root index and PRACH configuration index may be defined MTC device-specifically or MTC group-specifically.

Figure 5:
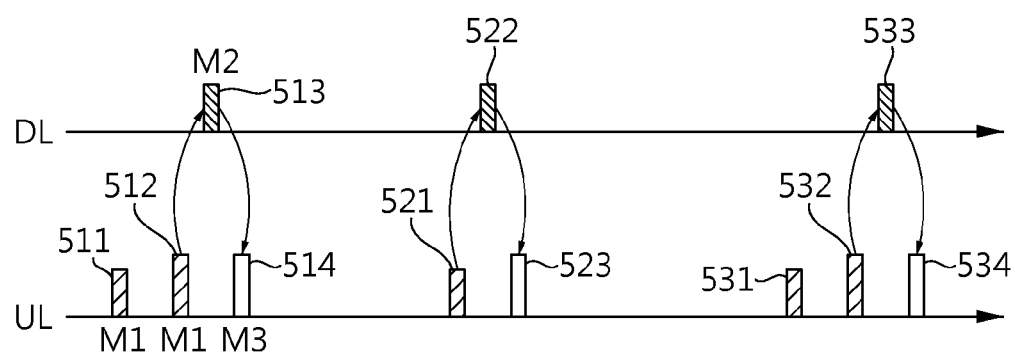
FIG. 5 shows a random access procedure according to an embodiment of the present invention.

FIG. 5 shows a random access procedure according to an embodiment of the present invention.

The MTC device-specifically or MTC group-specifically configured random access resource may include at least one of the followings:

(1) random access preamble (M1) or one for random access of the MTC device (or MTC group)

(2) time/frequency used for transmission of random access preamble (M1). For example, sub-frame number, transmission period, transmission timing, etc.

(3) maximum count of re-transmission of random access preamble (M1)

(4) DL resource where random access response (M2) is transmitted (5) UL resource for transmission of M3 message The MTC device may transmit random access preambles 511, 512, 521, 531, and 532 at the random access transmission timing.

The base station may transmit random access responses 513, 522, and 533 in response to the random access preambles 512, 521, and 532. The random access responses 513, 522, and 533 may include UL grants. In case of MTC device with low mobility, the random access responses 513, 522, and 533 might not include a TAC. The random access responses 513, 522, and 533 may be transmitted as MAC PDUs or on PDCCH.

The random access preamble may be re-transmitted up to the maximum number of times for attempting re-transmission as given. For example, the maximum number of times for attempting re-transmission may be two including the initial transmission. If the MTC device fails to receive a random access response even after transmitting the random access preamble the maximum number of times for re-transmission, the MTC device may give up the random access procedure.

Figure 6:
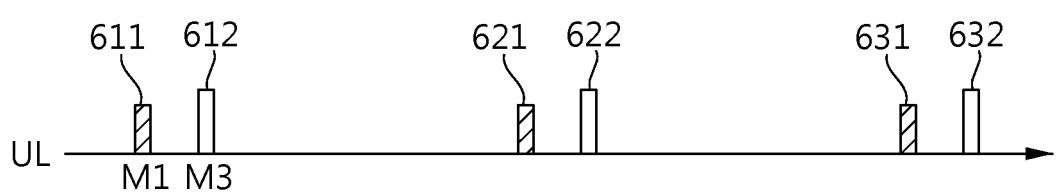
FIG. 6 shows a random access procedure according to another embodiment of the present invention.

FIG. 6 shows a random access procedure according to another embodiment of the present invention.

The random access resource configured MTC device-specifically or MTC group-specifically may include at least one of the followings.

(1) random access preamble (M1) or one for random access of the MTC device (or MTC group)

(2) time/frequency used for transmission of random access preamble (M1). For example, sub-frame number, transmission period, transmission timing, etc.

(3) UL resource for transmission of M3 message.

The MTC device may transmit random access preambles 611, 621, and 631 at a given random access transmission timing. The MTC device transmits pre-allocated UL resources, M3 messages 612, 622, and 632 to the base station in a next sub-frame or at a predetermined time.

Since resources for M3 messages 612, 622, and 632 are pre-allocated, the MTC device transmits the M3 messages 612, 622, and 632 to the base station without awaiting a random access response.

Since there is no random access response, UL time sync might not be maintained. In order for the transmission time period for M3 message not to depart a lot from the sub-frame boundary from the point of view of base station's reception, it may be set to be shorter than the general UL transmission period. For example, the M3 message may be transmitted in OFDM symbols whose number is smaller than the number of OFDM symbols constituting one sub-frame. The number of OFDM symbols where the M3 message is transmitted may be pre-designated or may be known to the MTC device by the base station.

Figure 7:
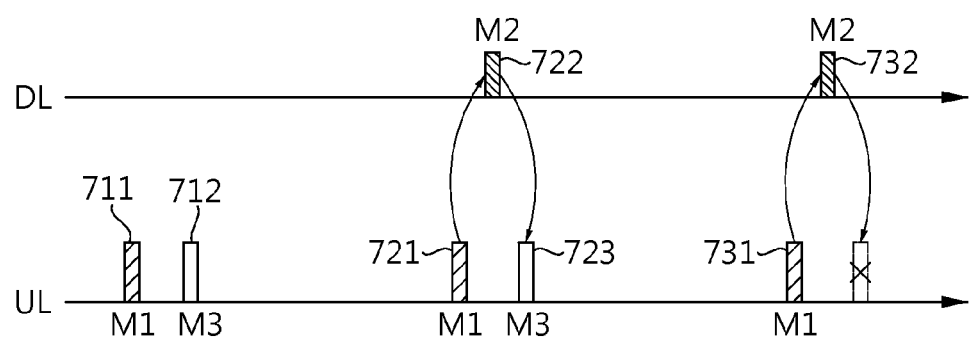
FIG. 7 shows a random access procedure according to still another embodiment of the present invention.

FIG. 7 shows a random access procedure according to still another embodiment of the present invention.

The MTC device-specifically or MTC group-specifically configured random access resource may include at least one of the followings:

(1) random access preamble (M1) or one for random access of the MTC device (or MTC group)

(2) time/frequency used for transmission of random access preamble (M1). For example, sub-frame number, transmission period, transmission timing, etc.

(3) maximum count of re-transmission of random access preamble (M1)

(4) DL resource where random access response (M2) is transmitted (5) UL resource for transmission of M3 message (6) flag indicating whether M3 is transmitted without M2

The MTC device may transmit random access preambles 511, 512, 521, 531, and 532 at the random access transmission timing.

The MTC device may transmit the random access preamble 711 at a given random access transmission timing. When receiving no random access response, the MTC device may transmit the M3 message 712 using a given UL resource. Or, if there is a random access response as received previously, the M3 message 712 may be sent using the UL resource in the previous random access response.

The MTC device may transmit the random access preamble 721 at a given random access transmission timing. The MTC device receives the random access response 722. The random access response 722 may include at least any one of TAC, UL transmission power, and UL resource. If TAC is given, the MTC device may adjust UL timing. If UL transmission power is given, the MTC device may adjust UL timing. If UL transmission power is given, the MTC device may adjust UL transmission power. If UL resource is given, the MTC device may transmit the M3 message 723 using the given UL resource.

The MTC device may transmit the random access preamble 731 at a given random access transmission timing. The MTC device receives the random access response 732. If the random access response 732 does not include UL resource or indicates a specific value, the MTC device might not transmit the M3 message. Or, the random access response 732 may include an indicator indicating whether to transmit the M3 message.

The random access preamble is transmitted once or may be re-transmitted as many as a predetermined maximum number.

According to the embodiments described above in connection with FIGS. 5 to 7, a random access procedure is performed based on a random access resource pre-allocated semi-statically. Activation/deactivation of the pre-allocated random access resource may be signaled by the base station. The base station allocates a random access resource and delivers activation of the allocated random access resource to the MTC device (or MTC group). After activation, the MTC device may perform a random access procedure according to the embodiments described above in connection with FIGS. 5 to 7. The base station may instruct deactivation of the allocated random access resource. Activation/deactivation of the random access resource may be delivered alongside or separately from the random access resource through a PDCCH, MAC message, or RRC message.

Figure 8:
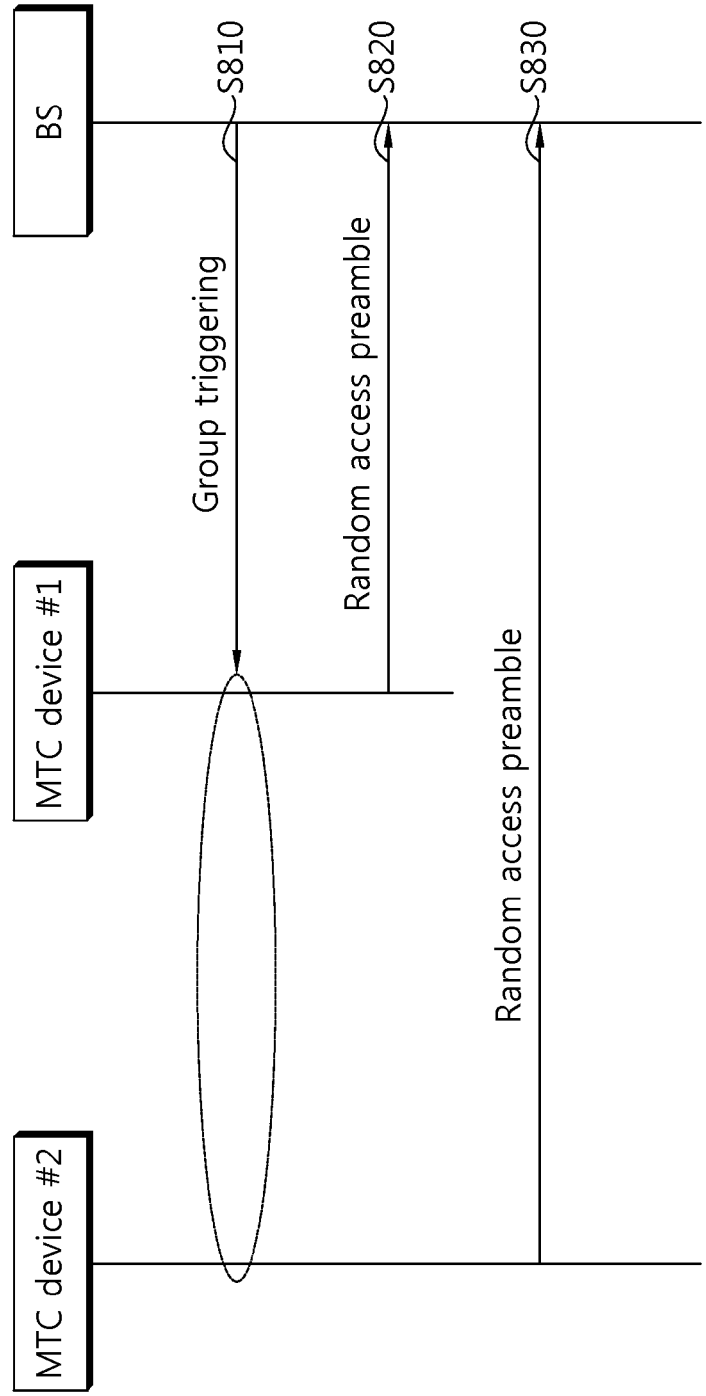
FIG. 8 is a flowchart illustrating a random access procedure using group triggering according to an embodiment of the present invention.

FIG. 8 is a flowchart illustrating a random access procedure using group triggering according to an embodiment of the present invention.

The base station may instruct triggering of uplink random access on the MTC group in order to collect data from a plurality of MTC devices. This may be useful when collecting UL data from an MTC device with unclear uplink sync at any time as needed by the network.

The base station transmits a group triggering message, which indicates triggering a random access procedure, to the MTC devices (S810).

The group triggering message may be transmitted on PDCCH. The group triggering message may include a device identifier (e.g., C-RNTI, MAC address, etc.) indicating MTC devices for which a random access procedure is triggered and/or an MGID indicating an MTC group for which a random access procedure is triggered. Or, the PDCCH may be masked with a G-RNTI (group-RNTI) corresponding to the device identifier or MGID.

Here, by way of example, a random access procedure is triggered on an MTC group including MTC device #1 and MTC device #2. The number of MTC devices included in the MTC group is merely an example. Further, a plurality of MTC groups may be triggered.

MTC device #1 sends a random access preamble using a pre-configured random access resource (S820). MTC device #2 sends a random access preamble using a pre-configured random access resource (S830).

In an embodiment, a random access preamble may be configured per MTC device. Since a dedicated random access resource is configured for each MTC device, contention may minimally occur, and the random access procedure may be performed more quickly.

In another embodiment, a random access resource may be configured per MTC group or per base station region. Since a random access resource is shared by a plurality of MTC devices, a contention may take place. At this time, to reduce collision between random access preambles due to the contention, the MTC devices may be rendered to apply respective backoff times before the random access preambles are transmitted. An MTC device which fails in the contention may perform backoff as many as the maximum count of re-transmission.

In order to perform a random access procedure based on a pre-configured random access resource, the embodiments described above in connection with FIGS. 5 to 7 may apply alone or in combination.

The above-described M3 message carries not only the information necessary for the existing random access procedure but also a small amount of data in light of the feature of MTC and may be sent on PUSCH. Optionally, due to the feature of MTC that the amount of uplink data is small, the M3 message may be transmitted on PUCCH.

Figure 9:
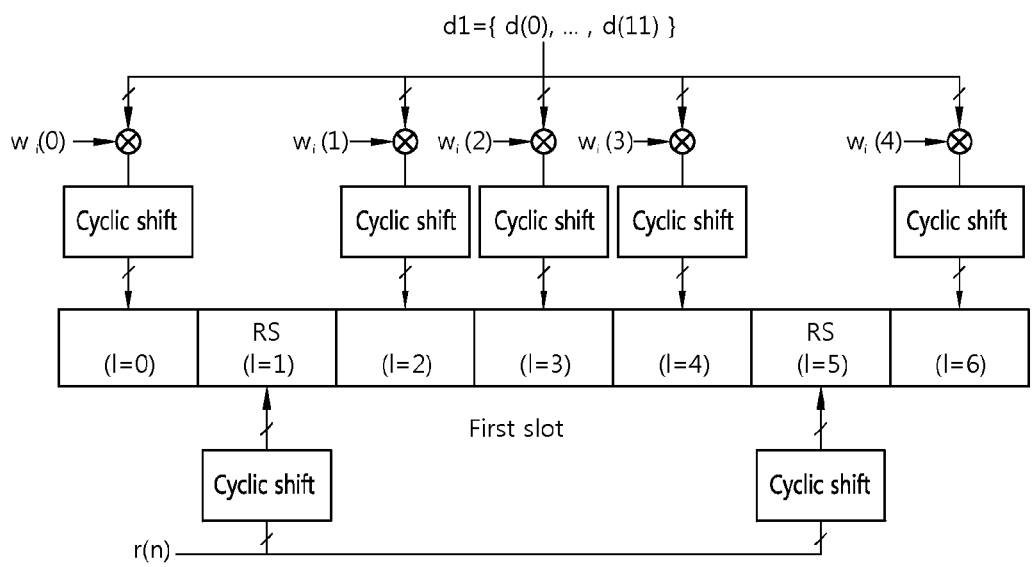
FIG. 9 shows an example of M3 message transmitted on PUCCH.
Figure 9:
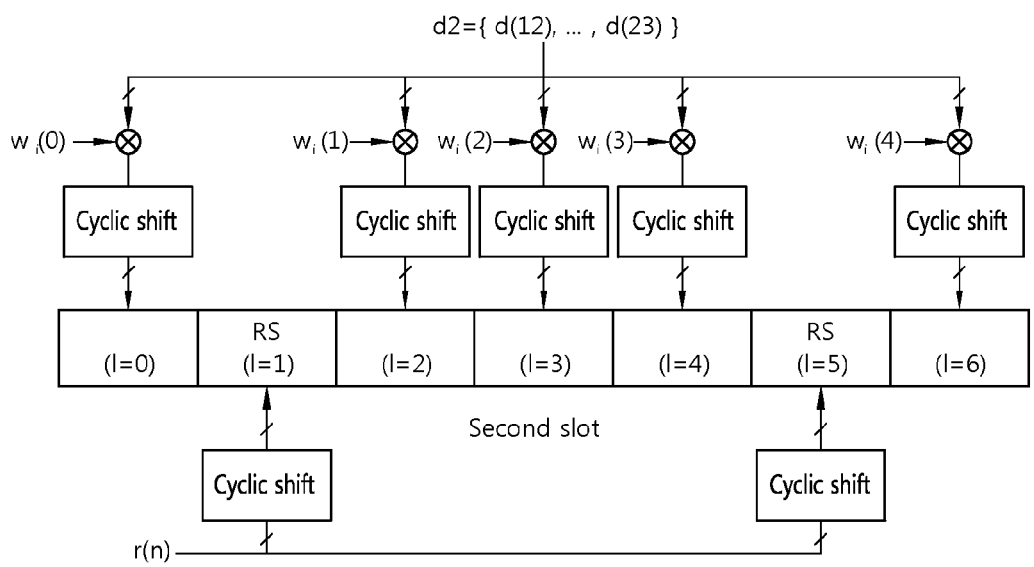

FIG. 9 shows an example of M3 message transmitted on PUCCH.

As described above, a UL sub-frame includes two slots, and each slot includes seven OFDM symbols. 1 is an OFDM symbol number and is 0 to 6. Two OFDM symbols with l=1, 5 are RS OFDM symbols for reference signal, and the remaining OFDM symbols are data OFDM symbols for M3 message. One PUCCH uses one RB (resource block).

The information bits of M3 message are modulated to generate symbol sequence d={d(0), d(1), . . . , d(23)}. If QPSK (quadrature phase-shift keying) is adopted, up to 48 encoded information bits may be transmitted. d(n) (n=, 1, . . . , 23) refers to a complex-valued modulation symbol. Symbol sequence d may be a set of modulation symbols. The number of bits in the M3 message or modulating scheme are merely an example and are not limited thereto.

1 RB uses 12 sub-carriers, and thus, symbol sequence d={d(0), d(1), . . . , d(23)} is divided into two symbol sequences with a length of 12, i.e., d1={d(0), . . . , d(11)} and d2={d(12), . . . , d(23)}. The first symbol sequence d1 is transmitted in the first slot, and the second symbol sequence d2 is transmitted in the second slot.

The symbol sequence is spread with an orthogonal sequence $w_i$. The symbol sequence corresponds to each data OFDM symbol, and the orthogonal sequence is used to distinguish the PUCCHs (or terminals) by spreading the symbol sequence over data OFDM symbols.

The orthogonal sequence has a spreading factor K=5 and includes five elements. The orthogonal sequence may be selected from among five orthogonal sequences in the following table depending on orthogonal sequence index i:

TABLE 2

| Index (i) | $[w_i(0), w_i(1), w_i(2), w_i(3), w_i(4)]$ |
|---|---|
| 0 | $[+1, +1, +1, +1, +1]$ |
| 1 | $[+1, e^{j2\pi/5}, e^{j4\pi/5}, e^{j6\pi/5}, e^{j8\pi/5}]$ |
| 2 | $[+1, e^{j4\pi/5}, e^{j8\pi/5}, e^{j2\pi/5}, e^{j6\pi/5}]$ |
| 3 | $[+1, e^{j6\pi/5}, e^{j2\pi/5}, e^{j8\pi/5}, e^{j4\pi/5}]$ |
| 4 | $[+1, e^{j8\pi/5}, e^{j6\pi/5}, e^{j4\pi/5}, e^{j2\pi/5}]$ |

Two slots in the sub-frame may use different orthogonal sequence indexes from each other.

Each spread symbol sequence is cyclic-shifted by a cell-specific cyclic shift value $n^{cell}_{cs}(n_s,1)$. Each cyclic-shifted symbol sequence is mapped with its corresponding OFDM symbol and is then transmitted. The $n^{cell}_{cs}(n_s,1)$ is a cell-specific parameter that is determined by a pseudo-random sequence that is initialized based on a PCI (Physical Cell Identity). The $n^{cell}_{cs}(n_s,1)$ varies depending on slot number $n_s$ in the radio frame and OFDM symbol number 1 in the slot.

Or, each spread symbol sequence may be cyclic-shifted MTC device-specifically or MTC group-specifically.

A reference signal sequence used for demodulating the M3 message is transmitted, mapped in two RS OFDM symbols.

Figure 10:
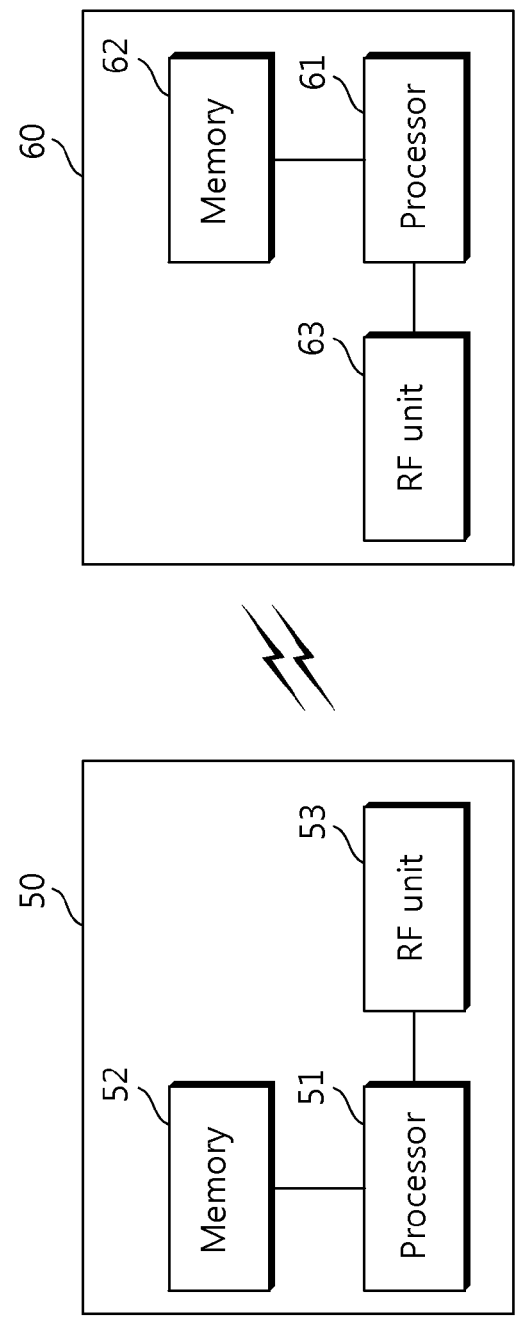
FIG. 10 is a block diagram illustrating a wireless communication system in which an embodiment of the present invention is implemented.

FIG. 10 is a block diagram illustrating a wireless communication system in which an embodiment of the present invention is implemented.

The base station 50 includes a processor 51, a memory 52, and an RF (radio frequency) unit 53. The memory 52 is connected with the processor 51 and stores various pieces of information to drive the processor 51. The RF unit 53 is connected with the processor 51 and transmits and/or receives radio signals. The processor 51 implements suggested functions, processes, and/or methods. In the embodiments described above in connection with FIGS. 5 to 8, the operation of the base station may be implemented by the processor 51.

The terminal 60 includes a processor 61, a memory 62, and an RF unit 63. The memory 62 is connected with the processor 61 and stores various pieces of information to drive the processor 61. The RF unit 63 is connected with the processor 61 and transmits and/or receives radio signals. The processor 61 implements suggested functions, processes, and/or methods. In the embodiments described above in connection with FIGS. 5 to 8, the operation of the terminal may be implemented by the processor 61.

The processor may include an ASIC (application-specific integrated circuit), other chipsets, a logic circuit and/or a data processing device. The memory may include an ROM (read-only memory), an RAM (random access memory), a flash memory, a memory card, a storage medium and/or other storage devices. The RF unit may include a base band circuit for processing a radio signal. When an embodiment is implemented in software, the above-described schemes may be realized in modules (processes, functions, etc.) for performing the above-described functions. The modules may be stored in the memory and executed by the processor. The memory may be positioned in or outside the processor and may be connected with the processor via various well-known means.

In the above exemplary system, the methods have been described in conjunction with flowcharts having a series of steps or blocks. However, the present invention is not limited to the order of the steps, and some steps may occur simultaneously or in an order different from the above-described steps. It may be understood by one of ordinary skill in the art that the steps in the flowcharts are not exclusive and some other steps may be added or one or more of the steps in the flowcharts may be deleted without affecting the scope of the present invention.

What is claimed is:

1. A method of performing a random access procedure in a wireless communication system, the method performed by a machine-type communication (MTC) device and comprising:
    receiving configuration information for a random access procedure from a base station,
    wherein the configuration information includes resource information for transmitting a random access preamble, root index information for generating the random access preamble and activation information to perform the random access procedure using the resource information, and
    wherein the resource information and the root index information are specific to the MTC device;
    generating the random access preamble based on the root index information;
    transmitting, to the base station, the random access preamble on a random access resource determined based on the resource information;
    receiving a random access response in response to the random access preamble; and
    transmitting a scheduled message to the base station,
    wherein the random access resource is configured for the MTC device or a group to which the MTC device belongs.

2. The method of claim 1, wherein the received configuration information includes a transmission period of the random access preamble.

3. The method of claim 1, wherein the received configuration information includes information on a maximum count for re-transmission of the random access preamble.

4. The method of claim 1, wherein the random access resource includes an uplink resource, and the scheduled message is transmitted using the uplink resource.

5. The method of claim 1, wherein the random access response includes information on uplink transmission power.

6. The method of claim 1, wherein the random access response includes an indicator indicating whether the scheduled message is transmitted.

7. The method of claim 1, further comprising receiving, from the base station, a group triggering message indicating transmission of the random access preamble.

8. The method of claim 7, wherein the group triggering message is masked with an identifier of the MTC device or an identifier of a group to which the MTC device belongs.

9. A machine-type communication (MTC) device for performing a random access procedure in a wireless communication system, the MTC device comprising:
    a radio frequency (RF) unit configured to transmit and receive a radio signal; and
    a processor connected with the RF unit, wherein the processor is configured to:
    receive configuration information for a random access procedure from a base station,
    wherein the configuration information includes resource information for transmitting a random access preamble, root index information for generating the random access preamble and activation information to perform the random access procedure using the resource information, and
    wherein the resource information and the root index information are specific to the MTC device;
    generate the random access preamble based on the root index information;
    transmit, to the base station, the random access preamble on a random access resource determined based on the resource information;
    receive a random access response in response to the random access preamble; and
    transmit a scheduled message to the base station,
    wherein the random access resource is configured for the MTC device or a group to which the MTC device belongs.

10. The radio device of claim 9, wherein the received configuration information includes a transmission period of the random access preamble.

11. The radio device of claim 9, wherein the received configuration information includes an uplink resource, and the scheduled message is transmitted using the uplink resource.

12. The radio device of claim 9, wherein the processor receives, from the base station, a group triggering message indicating transmission of the random access preamble.

* * * * *